(12) United States Patent
Pfefferkorn

(10) Patent No.: US 11,654,642 B2
(45) Date of Patent: May 23, 2023

(54) PROCESS AND APPARATUS FOR CHEMICAL SMOOTHING OF PLASTIC PARTS

(71) Applicant: LuxYours E.K., Munich (DE)

(72) Inventor: Florian Pfefferkorn, Munich (DE)

(73) Assignee: LuxYours E.K, Planegg (DE)

( * ) Notice: Subject to any disclaimer, the term of this patent is extended or adjusted under 35 U.S.C. 154(b) by 203 days.

(21) Appl. No.: 16/981,317

(22) PCT Filed: Mar. 4, 2019

(86) PCT No.: PCT/EP2019/055312
§ 371 (c)(1),
(2) Date: Sep. 16, 2020

(87) PCT Pub. No.: WO2019/179755
PCT Pub. Date: Sep. 26, 2019

(65) Prior Publication Data
US 2021/0008819 A1    Jan. 14, 2021

(30) Foreign Application Priority Data

Mar. 22, 2018 (DE) ...................... 10 2018 002 401.7

(51) Int. Cl.
*B29C 37/02* (2006.01)
*B29C 71/02* (2006.01)
(Continued)

(52) U.S. Cl.
CPC ........ *B29C 71/009* (2013.01); *B29C 71/0009* (2013.01); *B33Y 40/00* (2014.12);
(Continued)

(58) Field of Classification Search
CPC ..... B29C 37/02; B29C 64/188; B29C 64/379; B29C 71/0009; B29C 71/009;
(Continued)

(56) References Cited

U.S. PATENT DOCUMENTS

| 4,302,418 A | 11/1981 | Cullis |
| 6,004,403 A | 12/1999 | Gray |

(Continued)

FOREIGN PATENT DOCUMENTS

| DE | 19939032 | 10/2000 |
| RU | 2625848 | 7/2017 |

(Continued)

OTHER PUBLICATIONS

Translation of RU 2625848 C1 (published on Jul. 19, 2017).*
International Search Report for PCT/EP2019/055312, dated Jun. 6, 2019.
Hofer Chemie GmbH; Product Data Sheet: pure acetone; Feb. 5, 2012.
The Carl Roth GmbH + Co. KG; Product Data Sheet: Dichlormethan Rotisolv HPLC: Apr. 8, 2016.

(Continued)

*Primary Examiner* — Leo B Tentoni
(74) *Attorney, Agent, or Firm* — Sheehan Phinney Bass & Green PA

(57) ABSTRACT

The invention relates to a process and an apparatus for chemical smoothing of a plastic part (10) produced by selective layerwise consolidation of a construction material. The process comprises the steps of: temperature-controlling the plastic part to a first temperature; temperature-controlling solvent vapour (8) comprising a solvent to a second temperature; subjecting the plastic part (10) to the solvent vapour (8) temperature-controlled to the second temperature for a particular duration, wherein the subjecting of the plastic part (10) to the solvent vapour (8) has the result that an outer layer of the plastic part (10) is liquefied; and discharging at least a portion of the solvent vapour (8) after the particular duration, wherein the plastic part (10) is stationary from commencement of the temperature-control- (Continued)

Figure 2A:
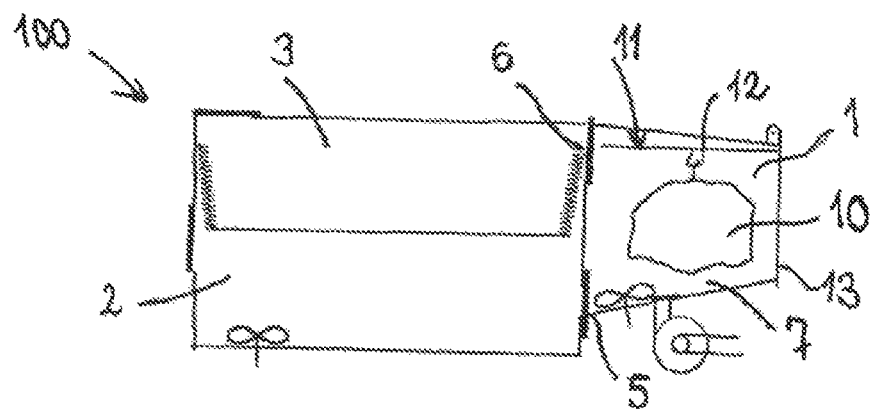

ling of the plastic part until termination of the discharging of the solvent vapour (8).

18 Claims, 12 Drawing Sheets

(51) Int. Cl.
| | |
|---|---|
| *F26B 3/20* | (2006.01) |
| *F26B 9/06* | (2006.01) |
| *F26B 21/14* | (2006.01) |
| *F26B 25/14* | (2006.01) |
| *B29C 71/00* | (2006.01) |
| *B33Y 40/20* | (2020.01) |
| *B33Y 40/00* | (2020.01) |
| *F26B 25/00* | (2006.01) |
| *B29C 64/379* | (2017.01) |
| *B29C 64/188* | (2017.01) |

(52) U.S. Cl.
CPC ............ *B33Y 40/20* (2020.01); *F26B 25/001* (2013.01); *B29C 64/188* (2017.08); *B29C 64/379* (2017.08)

(58) Field of Classification Search
CPC ........... B29C 71/02; B33Y 40/20; F26B 3/20; F26B 9/06; F26B 21/14; F26B 25/001; F26B 25/14
USPC ......... 264/40.6, 341, 345; 425/73, 143, 445; 34/209, 210, 211, 215, 218, 237, 443, 34/493, 497

See application file for complete search history.

(56) References Cited

U.S. PATENT DOCUMENTS

| | | |
|---|---|---|
| 3,075,300 A1 | 12/2011 | Zinniel |
| 2008/0169585 A1 | 7/2008 | Zinniel |
| 2009/0321972 A1 | 12/2009 | Zinniel |
| 2019/0375158 A1* | 12/2019 | Crabtree ............. B29C 71/0009 |

FOREIGN PATENT DOCUMENTS

| | | |
|---|---|---|
| WO | 03/089218 | 10/2003 |
| WO | 2011/145960 | 11/2011 |
| WO | 2018-127683 | 7/2018 |
| WO | WO-2018177734 A1 * | 10/2018 ......... B29C 71/0009 |

OTHER PUBLICATIONS

Loba Chemie; Product Data Sheet; Carbon Tetrachloride AR; Apr. 9, 2015.
The Carl Roth GmbH + Co. KG; Product Data Sheet; Trichlormethan Rotipuran; Aug. 22, 2018.
Wikipedia; "Ventil"; Dec. 4, 2020.
German Patent and Trademark Office; Internet Printout concerning Registration in Germany of EP3565712; Dec. 8, 2020.

* cited by examiner

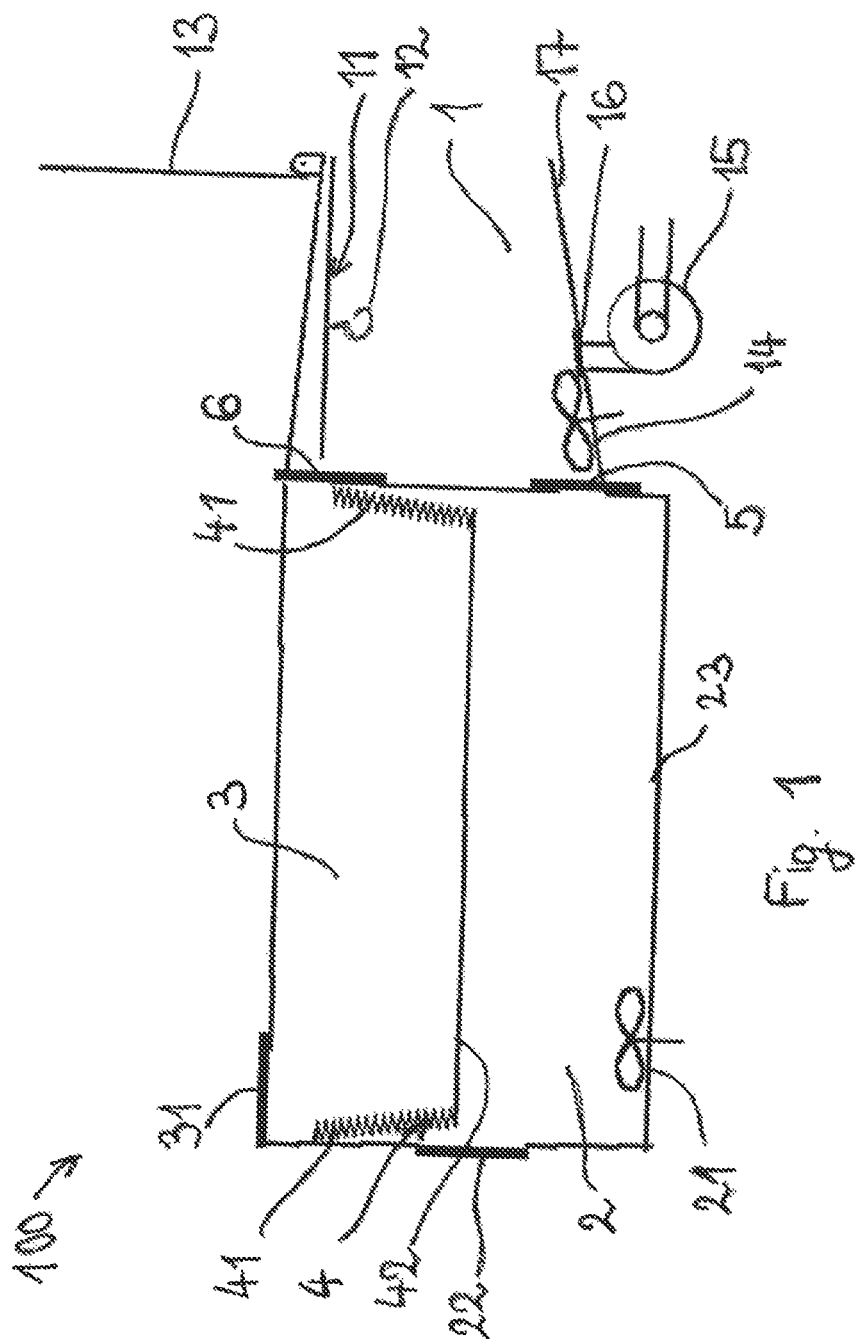

PROCESS AND APPARATUS FOR CHEMICAL SMOOTHING OF PLASTIC PARTS

CROSS-REFERENCE TO RELATED APPLICATIONS

This application is a national stage entry of PCT/EP2019/055312, filed Mar. 4, 2019 and entitled Process And Apparatus For Chemical Smoothing Of Plastic Parts, which claims priority to German application number 102018002401.7, filed Mar. 22, 2018 and entitled Verfahren and Vorrichtung zum chemischen Glatten von Kunststoffteilen. Each of these applications is incorporated by reference in its entirety.

The subject matter of the invention is a process for chemical smoothing of a plastic part produced by selective layerwise consolidation of a construction material and an apparatus for chemical smoothing of a plastic part produced by selective layerwise consolidation of a construction material. Specifically, the invention relates to a process and an apparatus for chemical smoothing by means of which the duration for which the plastic part is subjected to solvent vapour for smoothing can be controlled exactly.

3-D printing processes are frequently used nowadays for the generation of components. By means of 3-D printing processes which are implemented by so-called 3-D printers it is possible to generate three-dimensional models and/or "printings" from the data of three-dimensional drawings produced on a computer.

Components generated by means of 3-D printing processes fulfil quite varying objects. While, still a few years ago, the components were often used as demonstration, assembly or functional models only, 3-D printing components have recently also increasingly been used as finished components for series production. The manufacturing of 3D printing components for series production is comprised by the term of so-called additive manufacturing.

Apart from the basic shaping function, however, series components also have to meet further criteria. One important characteristic is i.a. the surface quality. 3-D printing components require, for various reasons, an improved surface quality. First of all it has to be noted that 3-D printing components comprise, due to their layerwise production, layer stages conditioned by the process. The faster a component is to be constructed the stronger these layer stages are pronounced. From thicker layers a voluminous object may be constructed more quickly.

Moreover, some 3-D printing processes operate with powdered materials (such as e.g. described in the international patent application with publication number WO 88/02677 A2). The surface quality of the components printed with the aid of a 3-D printing process comprises with these processes, in addition to the layer stages, a granular coarseness which is significantly influenced by the surface quality of the powder particles.

Some 3-D printing processes require mechanical post-processing of the components, e.g. for removing support structures. At the places which have been post-processed mechanically, the differences over the non-processed areas are clearly visible. The irregularities constitute a deficiency for the component.

Due to the afore-mentioned basic shortcomings of the 3-D printing components it is a challenge to fulfil the requirements that have to be met during the production of series components. They include in particular the wear and abrasion resistance of the surface of the component, cleanability and friction coefficient of the surface, sealing properties and tightness, dimensional accuracy, complying with predetermined fluid-dynamic characteristics, aesthetic gloss and homogeneity of the surface appearance.

The requirements mentioned apply both for the inner and the outer surfaces of the components.

Traditional surface finishing methods such as grinding, processing, varnishing and sandblasting do, in the case of plastic parts, such as e.g. the afore-described 3-D printing components, often not achieve the desired result, or apply an additional substance onto the surface which may then flake off again and specifically has to be certified regulatorily. Also, the traditional methods have difficulties with the surfaces in the interior of the plastic parts, e.g. in conduits or channels.

The international patent application with the publication number WO 03/089218 A1 describes a solvent vapour bath into which an object to be smoothed is immersed from the top. The chamber is open to the top and solvent vapour may exit. Furthermore, a solvent vapour basin, as described, comprises, depending on the solvent evaporated, different concentrations and temperatures of the vapour. At the bottom of the basin vapour will be present which is saturated more strongly, but is simultaneously cooler, and further up in the basin the concentration decreases. Such a process is difficult to control and to automate.

The international publication WO 2011/145960 A1 describes a construction which constitutes a safe, encased arrangement for the operator. Nevertheless, the method described does not provide a possibility of controlling the saturation of the vapour and the temperature of the object to be smoothed.

Both documents mentioned do not describe a preparatory and a post-production treatment of the components. If, however, the temperature and the amount of solvent condensing on the component and then drying again are not adjusted correctly, the components will subsequently comprise deficiencies which are not acceptable for series components. These deficiencies may cause stains on the components as well as melted or washed-off material which may, in an extreme case, also solidify on the underside of the components in the form of an undesired material agglomeration.

It is therefore an object of the present invention to provide a process suitable for series production and a corresponding apparatus which remedy the shortcomings of the afore-described state of the art, especially a process and a corresponding apparatus for chemical smoothing of plastic parts which both enable a safe working environment and render the chemical smoothing process controllable in the relevant characteristics.

This object is solved by the process for chemical smoothing of a plastic part produced by selective layerwise consolidation of a construction material and by the apparatus for chemical smoothing of a plastic part produced by selective layerwise consolidation of a construction material.

In accordance with a first aspect of the invention there is provided a process for chemical smoothing a plastic part produced by selective layerwise consolidation of a construction material, comprising the steps of: temperature-controlling the plastic part to a first temperature; temperature-controlling solvent vapour comprising a solvent to a second temperature; subjecting the plastic part to the solvent vapour temperature-controlled to the second temperature for a particular duration, wherein the subjecting of the plastic part to the solvent vapour has the result that an outer layer of the plastic part is liquefied; and discharging at least a portion of the solvent vapour after the particular duration, wherein the plastic part is stationary from commencement of the temperature-controlling of the plastic part until termination of the discharging of the solvent vapour.

A process for the production of the plastic part by selective layerwise consolidation of a construction material is, for instance, known under the name of "selective laser sintering" or "selective laser melting". In this process, a thin layer of a powdered construction material is applied repeatedly and the construction material is, in each layer, consolidated selectively with a laser by the selective irradiation of places which correspond to a cross-section of the object to be manufactured. The powdered construction material is expediently a plastic powder. Typically, processes for manufacturing the plastic part by selective layerwise consolidation of a construction material are used during rapid prototyping or additive manufacturing. The term additive manufacturing also includes 3-D printing processes for the manufacturing of 3-dimensional objects.

Preferably, the step of temperature-controlling of the plastic part comprises: positioning the plastic part in a first chamber filled with a gas or gas mixture. Preferably, the step of temperature-controlling of the plastic part comprises: temperature-controlling the first chamber to a first temperature to thus temperature-control the plastic part at least approximately to the first temperature. Preferably, the step of temperature-controlling of the solvent vapour comprises: filling a second chamber with a solvent vapour comprising a solvent. Preferably, the step of temperature-controlling of the solvent vapour comprises: temperature-controlling the second chamber to the second temperature to thus temperature-control the solvent vapour at least approximately to a second temperature. Preferably, prior to subjecting the plastic part to the solvent vapour, the solvent vapour is introduced from the second chamber into the first chamber. Preferably, the step of discharging of at least a portion of the solvent vapour comprises: discharging at least a portion of the solvent vapour from the first chamber into the second chamber after the particular duration. Preferably, the step of discharging of at least a portion of the solvent vapour comprises: introducing of gas or gas mixture into the first chamber. The gas or gas mixture is advantageously temperature-controlled to a particular temperature. It is expedient if the gas or gas mixture is introduced from a third chamber into the first chamber.

The plastic part is positioned in the first chamber and preferably remains in the first chamber throughout the entire process. This has the advantage that the plastic part to be smoothed need not be moved into the solvent vapour and, after the exposure of the plastic part in the solvent vapour, be moved out from it again. Since, in accordance with the invention, the supplying and discharging of the solvent vapour, but not the movement of the plastic part is controlled during the chemical smoothing, the escaping of the solvent vapour from the designated chambers is prevented. It is therefore avoided during the performance of the process in accordance with the invention that the user gets into contact with the solvent vapour.

Due to the fact that the solvent vapour is introduced from the second chamber into the first chamber and can be discharged again after a particular duration it is ensured that the plastic part, after an outer layer of the plastic part has been subjected to the solvent vapour, may dry in an environment which is free of solvents which are generally harmful or dangerous to health. When removing the plastic part from the first chamber, the plastic part, which is then advantageously smoothed, is again in an environment which comprises at least predominantly the gas or gas mixture with which the first chamber was filled at the beginning of the process in accordance with the invention. The gas or gas mixture with which the first chamber is filled at the beginning is preferably air.

Moreover, the introducing of the solvent vapour form the second chamber into the first chamber, the subjecting of the plastic part to the solvent vapour for a particular duration, and the discharging of a predominant portion of the solvent vapour from the first chamber into the second chamber after the particular duration constitute steps for the specific control of the acting of the solvent vapour on the plastic part. The particular duration depends, for instance, on the concentration of the solvent in the solvent vapour. The lower the concentration of the solvent in the solvent vapour, the longer the particular duration should be chosen. In other words, the stronger the saturation of the solvent vapour with solvent, the shorter the particular duration. The particular duration is expediently in the range of 0 to 10 minutes, preferably between 0 and 1 minute, particularly preferred between 0 and 30 seconds, very preferred between 0 and 5 seconds. Due to the fact that the subjecting of the plastic part to the solvent vapour has the result that an outer layer of the plastic part is liquefied, the plastic part is smoothed. Existing steps, notches, irregularities etc. on the surface of the plastic part merge into each other fluently due to the liquefaction, so that smoothing takes place. The solvent is expediently chosen such that it reacts with the material of which the plastic part is manufactured and causes the liquefaction thereof.

By discharging the solvent vapour back into the second chamber it is possible to re-use the solvent vapour for further iterations of the process in accordance with the invention.

The fact that the first chamber is temperature-controlled to a particular first temperature and the second chamber is temperature-controlled to a particular second temperature also contributes to the specific control of the subjecting of the plastic part to the solvent vapour. Due to the temperature-controlling of the first chamber the plastic part is also heated/temperature-controlled to at least approximately the first temperature. The selection of the temperature in the second chamber allows adjusting the temperature of the solvent vapour. By the selection of the temperature of the second chamber it is thus also possible to adjust the concentration of the solvent in the solvent vapour, especially the maximum concentration of the solvent in the solvent vapour, i.e. the concentration in the case of saturation of the solvent vapour. The concentration of the solvent in the solvent vapour may preferably also be adjusted by introducing a particular amount of liquid solvent into the second chamber and by its evaporating there. The latter may expediently also be implemented by heating the solvent to the appropriate boiling/evaporating temperature in the second chamber. It is further also possible that the concentration of the solvent in the solvent vapour is adjusted by flooding the second chamber only partially with solvent vapour, i.e. that a particular amount of solvent vapour of a particular temperature and with a particular degree of saturation is introduced into the second chamber and is mixed there with air present in the second chamber which has a different or the same particular temperature. Preferably, the degree of saturation of the solvent in the solvent vapour is between 10% and 95%, particularly preferred between 30% and 90%, very preferred between 50% and 70%.

Preferably, the second temperature is higher than the first temperature. Expediently, the first temperature is at least 50° C., preferably at least 70° C., particularly preferred at least 90° C., and very preferred at least 110° C. Expediently, the second temperature is at least 75° C., preferably at least 90° C., particularly preferred at least 105° C., and very preferred at least 120° C. Due to the fact that the temperature in the first chamber is lower than the temperature in the second chamber, the solvent condenses on the surface of the plastic part after the introduction of the solvent vapour into the first chamber. If the plastic part comprises inner surfaces, such as e.g. apertures, channels, bores, these inner surfaces are, in accordance with the invention, included by the surface of the plastic part. This means that, in accordance with the invention, smoothing of inner surfaces may also be performed.

In a particularly preferred manner the solvent vapour in the second chamber is saturated with the solvent before being introduced into the first chamber. This means that the solvent vapour cannot absorb any further solvent in the vapour state. The solvent vapour is preferably composed of the solvent in vapour form and a further gas or gas mixture, preferably air. In the case of the saturated solvent vapour it is sufficient that the temperature in the first chamber is lower than the temperature in the second chamber. If the solvent vapour is not completely saturated, condensation of the solvent takes place in the first chamber on the plastic part which is temperature-controlled to the temperature of the first chamber if the first temperature is lower than the dew point temperature of the solvent with the given concentration of the solvent in the solvent vapour.

The dew point temperature is the temperature at which the solvent which has, at a given temperature, a particular concentration in the solvent vapour condenses.

Finally, by the separate adjustment of the first and second temperatures it is possible to adjust the temperature difference between the first and second chambers. This temperature difference determines the velocity at which the solvent condenses on the plastic part. Moreover, the temperature difference also determines the amount of solvent condensing on the plastic part. In other words, the selection of the first and second temperatures and/or the temperature difference enables to control the amount and the velocity with/at which the condensation of the solvent takes place. Specifically, by temperature-controlling the first chamber and thus the plastic part to be smoothed it is possible to avoid that the latter experiences a temperature shock which would result in too strong a precipitation or a "flooding" of the surface of the plastic part with solvent condensate.

In accordance with the invention it is thus possible to control the temperature of the solvent vapour, the temperature of the component to be smoothed before and after the contact with the solvent vapour, the concentration of the solvent in the solvent vapour, expediently the saturation concentration, and the duration of action of the solvent vapour. During the entire process the plastic part remains in a stationary position.

Advantageously, the process further comprises the following step: drying the plastic part, expediently in the first chamber, after discharging the solvent vapour. Preferably, the plastic part remains stationary during drying. During drying the temperature of the first chamber is preferably adjusted to a particular third temperature. The third temperature may differ from the first temperature. During drying the solvent evaporates from the surface of the plastic part. Thus, the surface solidifies again. In order to remove the evaporated solvent from the first chamber, it is preferably sucked from the first chamber. For this purpose it is of advantage that a suction device is coupled to the first chamber which is adapted to suck evaporated solvent from the first chamber. The sucking of the evaporated solvent minimises the risk that a user, when removing the plastic part from the first chamber after drying, gets into contact with the solvent.

It is expedient that the step of introducing the solvent vapour from the second chamber into the first chamber comprises that the volume of the second chamber is reduced. The volume reduction of the second chamber may consist in that the volume available for the solvent vapour in the second chamber is reduced. It is expedient if the step of discharging of at least a portion of the solvent vapour from the first chamber into the second chamber comprises that the volume of the second chamber is increased. Preferably, the first temperature is chosen such that the density of the gas or gas mixture prior to the introduction of the solvent vapour is lower than the density of the solvent vapour in the second chamber. The reducing of the volume of the second chamber when introducing the solvent vapour from the second chamber into the first chamber ensures that at least a large portion of the solvent vapour flows into the first chamber. The larger density of the solvent vapour produces, during the introduction into the first chamber, a buoyancy effect on the gas or the gas mixture of lower density in the first chamber. This ensures that a substantial portion of the gas or gas mixture which is present in the first chamber at the beginning is displaced from the first chamber. During the discharging of the solvent vapour its larger density has the advantage that, by the new filling of the first chamber with the gas or the gas mixture, the solvent vapour is urged back into the second chamber. The volume reduction of the second chamber may moreover cause increased pressure in the second chamber which results in that the solvent vapour is driven into the first chamber. Due to the volume increase, preferably to the volume prior to the volume reduction during the introduction of the solvent vapour into the first chamber, the solvent vapour has again the same volume available as at the beginning of the smoothing process. Thus, the solvent vapour can, by temperature-controlling to the second temperature, be restored to almost the same condition as prior to the introduction into the first chamber. Moreover, the pressure in the second chamber decreases. The pressure difference causes a suction effect on the solvent vapour in the first chamber. Thus, it is possible to re-use the solvent vapour for further iterations.

It is of advantage if the filling of the second chamber with the solvent vapour comprises that the solvent vapour is homogenised, preferably circulated, in the second chamber. Homogenising and/or circulating have the result that the solvent vapour is distributed homogeneously in the second chamber. Furthermore, it is of advantage if, while subjecting the plastic part to the solvent vapour in the first chamber, the solvent vapour in the first chamber is homogenised, preferably circulated. This has the result that the solvent vapour is distributed homogeneously in the first chamber. Thus, condensation takes place as uniformly as possible on the surface of the plastic part.

In accordance with a second aspect of the invention there is provided a process for smoothing of a plastic part comprising the following steps: positioning the plastic part in a first chamber filled with a gas or gas mixture; filling a second chamber with a solvent vapour comprising a solvent; and repeated running through of the steps from the temperature-controlling of the first chamber to the discharging of at least a portion of the solvent vapour in accordance with the first aspect of the invention. Preferably, with each running through the particular duration for which the plastic part is subjected to the solvent vapour is chosen differently. It may be expedient to prolong the particular duration from iteration to iteration.

The process according to the second aspect of the invention differs from the process according to the first aspect of the invention especially in that the solvent vapour is repeatedly introduced from the second chamber into the first chamber and discharged again. The plastic part is thus subjected repeatedly to the solvent vapour. For every iteration the first and/or second temperatures may be chosen differently as compared to the preceding iteration or to preceding iterations. Preferably, the plastic part is dried at least partially after each iteration.

For the entire process or individually for each iteration the advantageous, preferred and expedient embodiments of the process according to the first aspect of the invention may be applied. The advantages are the same as mentioned before in connection with the first aspect of the invention.

Moreover, by the repeated running through of the process steps mentioned it may be avoided in a controlled manner that an oversaturation of the surface of the plastic part with solvent condensate occurs, which would result in the formation of tears and drops. By drying the plastic part between two iterations it is possible to achieve an optimal drying of the surface. This contributes to the fact that no stains are produced on the surface of the plastic part.

In accordance with the invention there is further provided an apparatus for chemical smoothing of a plastic part, comprising a first chamber, a second chamber, and a drive element. The first chamber is adapted to be filled with a gas or gas mixture and comprises positioning means for receiving the plastic part as well as first heating means for temperature-controlling the first chamber to a first temperature. The second chamber is provided for receiving a solvent vapour which, when acting on the plastic part, causes an outer layer of the plastic part to solidify, and the second chamber comprises second heating means for temperature-controlling the second chamber to a second temperature. The first chamber is connected with the second chamber by a closable connection. The drive element is transferable from an initial position to an end position such that the transfer of the drive element from the initial position to the end position has the result that the solvent vapour is introduced from the second chamber into the first chamber if solvent vapour is present in the second chamber and the closable connection between the first chamber and the second chamber is open.

The apparatus in accordance with the invention is configured such that the process in accordance with the invention pursuant to the first aspect or the second aspect can be performed therewith. The advantages of the invention during smoothing of a plastic part correspond to those indicated before in connection with the processes of the first aspect and the second aspect of the invention and will therefore not be repeated in this place. Due to the fact that the first chamber can be temperature-controlled to a first temperature with the aid of the first heating means, also the gas or gas mixture, when filled in the first chamber, can be temperature-controlled at least approximately to the first temperature. Due to the fact that the second chamber can be temperature-controlled to a second temperature with the aid of the second heating means, also solvent vapour, when filled in the second chamber, can be temperature-controlled at least approximately to the second temperature. The first and second chambers are advantageously each thermally insulated from the environment.

The fact that the first chamber is connected with the second chamber by a closable connection ensures that the solvent vapour can be introduced from the second chamber into the first chamber. It is of advantage if the first chamber is thermally insulated from the second chamber if the closable connection is closed. A temperature exchange between the two chambers then normally takes place for a short time only, within which the solvent vapour is introduced from the second chamber into the first chamber or within which the solvent vapour is returned from the first chamber into the second chamber.

If the connection between the second and the first chambers is open, the drive element causes the solvent vapour to be introduced from the second chamber into the first chamber. Due to the fact that the drive element can be transferred from an initial position to an end position, a volume and/or pressure change of the second chamber thus takes place. Swift introduction of the solvent vapour from the second chamber into the first chamber is thus enabled if the closable connection is open.

After an amount of solvent vapour sufficient for smoothing the plastic part has been introduced into the first chamber, the closable connection may be closed again. It is expedient if the closable connection is re-opened after a particular duration. The opening of the closable connection then enables the supplying and/or returning of the solvent vapour into the second chamber. The exposure time of the plastic part in the solvent vapour may thus be controlled specifically.

It is of advantage if the apparatus further comprises a third chamber connected with the first chamber by a second closable connection. The third chamber is provided for receiving at least a portion of the gas or gas mixture from the first chamber if the drive element is transferred from the initial position to the end position and if the first chamber is filled with gas or gas mixture. Preferably, the third chamber comprises third heating means for temperature-controlling the third chamber to a third temperature. The third chamber is adapted to receive the gas or gas mixture received at the beginning in the first chamber and displaced from the first chamber due to the introduction of the solvent vapour from the second chamber into the first chamber. Thus, on the one hand, the gas or gas mixture can be stored in the apparatus, and it is avoided that this gas or gas mixture is dispensed to the environment. In other words, the gas or gas mixture displaced from the first chamber may be re-used. Furthermore, due to the fact that the third chamber receives at least a portion of the gas or gas mixture present in the first chamber during the introduction of the solvent vapour into the first chamber it is avoided that a substantial mixing of the solvent vapour with the gas or gas mixture takes place in the first chamber. Thus, it is ensured that the solvent vapour, during introduction into the first chamber, at a large part displaces the gas or gas mixture present there instead of mixing therewith. This displacement process is also encouraged if the solvent vapour has a larger density than the gas or gas mixture, as already explained in connection with the first and second aspects of the invention.

It is further expedient that the transferring of the drive means from the initial position to the end position causes the volume of the second chamber to be reduced. The result of the volume reduction of the second chamber is, on the one hand, a mechanical displacement of the solvent vapour from the second chamber; on the other hand, the pressure in the second chamber is increased. Thus, the introduction of the solvent vapour from the second chamber into the first chamber can be controlled and/or accelerated.

Preferably, the first chamber comprises a first homogenisation device, in a particularly preferred manner a first circulating device. Preferably, the second chamber comprises a second homogenisation device, in a particularly preferred manner a second circulating device. The homogenisation devices serve the circulation, the stirring, mixing etc. of the solvent vapour, gas and/or gas mixture. The second homogenisation device is expediently provided for preparing the solvent vapour in the second chamber as homogeneously as possible. The first homogenisation device is expediently provided for homogeneously maintaining the solvent vapour introduced into the first chamber. The advantages have been indicated in connection with the first and second aspects of the invention.

Preferably, the first chamber comprises an inclined inner wall which is configured such that at least a portion of the solvent vapour is discharged from the first chamber into the second chamber if solvent vapour is present in the first chamber, the closable connection between the first chamber and the second chamber is open, and the drive means is transferred from the end position to the initial position. It is particularly advantageous if the bottom surface and/or the top surface are inclined. The inclined inner wall has several advantages. On the one hand, it contributes to the fact that the solvent vapour, on opening of the closable connection, is discharged swiftly into the second chamber. Moreover, solvent which condenses in the first chamber and trickles onto the lowermost wall of the first chamber, which preferably corresponds to the inclined inner wall, is returned into the second chamber. In the second chamber the returned solvent may then be evaporated again.

It is expedient if the transferring of the drive means from the end position to the initial position causes at least a portion of the solvent vapour to be discharged from the first chamber into the second chamber if solvent vapour is present in the first chamber and the closable connection between the first chamber and the second chamber is open. Preferably, the transferring of the drive means from the end position to the initial position causes the volume of the third chamber to be reduced. Due to the volume increase of the second chamber the solvent vapour again has the same volume available as at the beginning of the smoothing process. Thus, by temperature-controlling to the second temperature the solvent vapour may be restored to almost the same condition as prior to the introduction into the first chamber. Moreover, the pressure in the second chamber decreases. The pressure difference causes a suction effect on the solvent vapour in the first chamber. Thus, the solvent vapour may be re-used for further iterations. The volume reduction of the third chamber has the result, if the second closable connection between the first chamber and the third chamber is open, that the gas or gas mixture present in the third chamber is again introduced into the first chamber. This gas or gas mixture thus leads to a displacement of the solvent vapour into the second chamber if the closable connection between the first chamber and the second chamber is open.

Preferably, the first chamber comprises an introduction device configured to be connected with the plastic part and to introduce the solvent vapour into the interior of the plastic part. The introduction device causes a compulsory introduction of the solvent vapour into the interior of the plastic part. With an introduction device of this kind it is possible to smooth inner surfaces of the plastic part, such as e.g. apertures, channels, bores.

In accordance with a further aspect of the invention the use of an apparatus in accordance with the invention for chemical smoothing of a plastic part is described.

The solvent comprises advantageously a strong acid, preferably carboxylic acid, sulphuric acid, hydrochloric acid, nitric acid, aqua regia; chlorinated hydrocarbons, preferably dichloromethane, trichloromethane, perchlorethene, tetrachlorethene; ketones, preferably acetone; ethers, preferably tetrahydrofuran; and/or aromatic hydrocarbons, preferably benzene, xylene, toluene, ethylbenzene.

Expediently, the plastic part comprises at least one of the polymers from the group consisting of polyether-imides, polycarbonates, polyphenylsulfones, polyphenylene oxides, polyethersulfones, acrylonitrile-butadiene-styrene copolymers, polyacrylates, polyesters, polyamides, polylactides, polyethyleneterephtalates, polymethylmetacrylates, polyaryl ether ketones, polyethers, polyurethanes, polyimides, polyamide-imides, polyolefines as well as copolymers comprising at least two different monomer units of the afore-mentioned polymers and/or at least one polymer blend on the basis of at least two of the afore-mentioned polymers and copolymers.

Figure 3A:
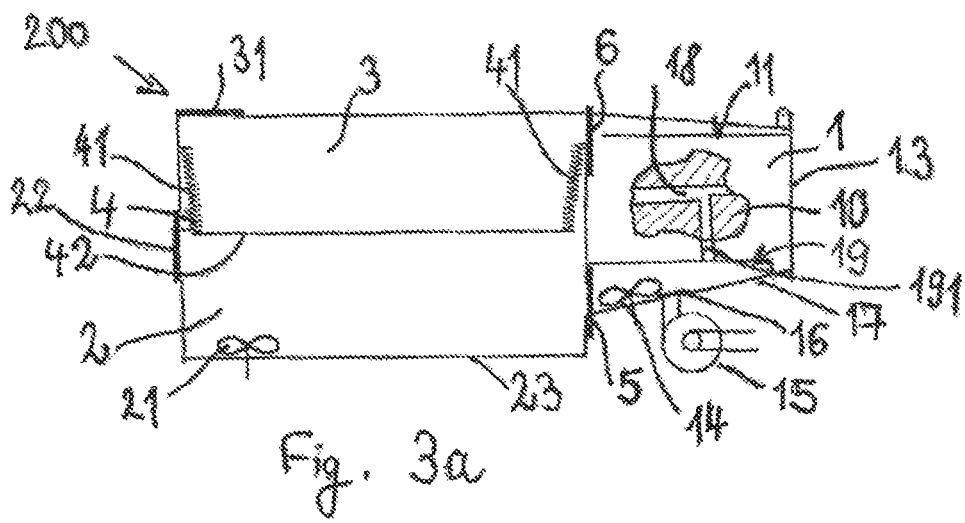
Figure 4A:
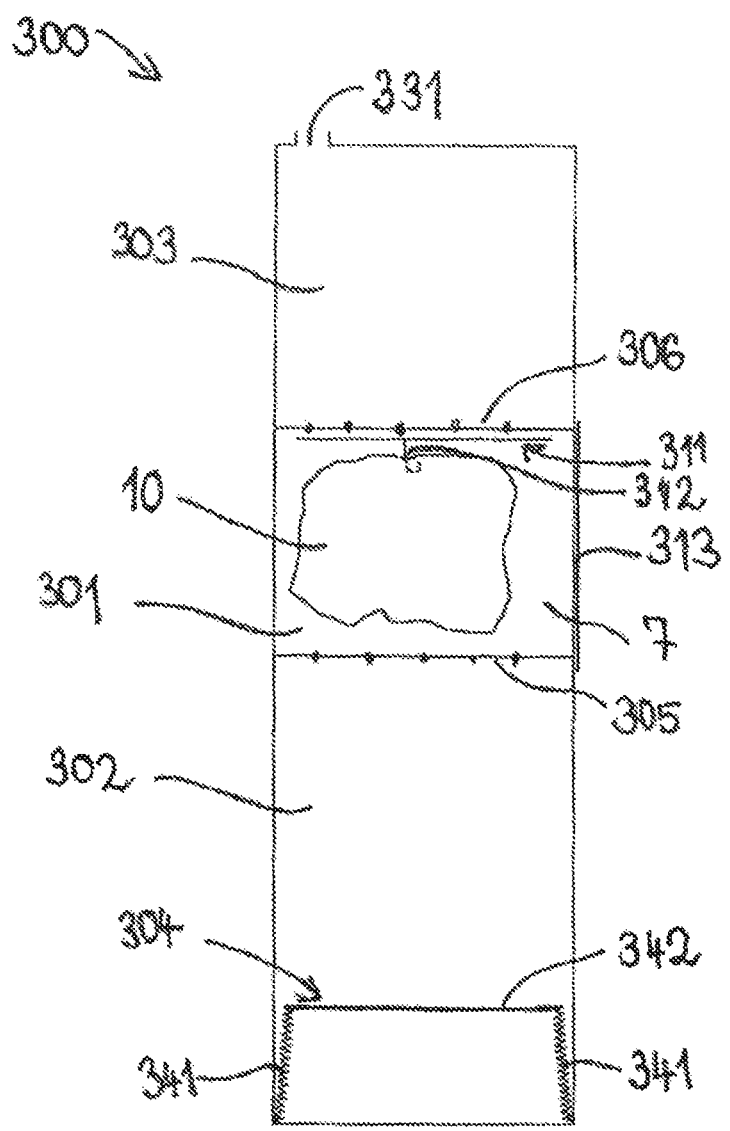

In the following, preferred embodiments of the present invention will be described by means of the following Figures. There show:

FIG. 1: an apparatus for chemical smoothing of a plastic part in accordance with a first embodiment of the invention;

FIGS. 2a-2k: the individual steps of the process in accordance with the invention for chemical smoothing of the plastic part using the apparatus according to the first embodiment;

FIG. 3a: an apparatus for chemical smoothing of a plastic part in accordance with a second embodiment of the invention which is specifically suited for the internal smoothing of the plastic part;

FIGS. 3a-3h: the individual steps of the process in accordance with the invention for chemical smoothing of the inner surfaces of a plastic part using the apparatus in accordance with second first embodiment;

FIG. 4a: an apparatus for chemical smoothing of a plastic part in accordance with a third embodiment of the invention;

FIGS. 4a-4g: the individual steps of the process in accordance with the invention for chemical smoothing of the plastic part using the apparatus in accordance with the third embodiment.

FIG. 1 shows an embodiment in accordance with the invention of an apparatus 100 for chemical smoothing of a plastic part produced by selective layerwise consolidation of a construction material. The apparatus comprises a first chamber 1, a second chamber 2, a third chamber 3, and a drive element 4.

The first chamber 1 serves to receive a plastic part (not illustrated) to be smoothed. For this purpose, positioning means 11 is provided in the first chamber 1. In FIG. 1 the positioning means 11 is illustrated as a crane. It comprises, specifically for holding the plastic part, a hook 12. The first chamber 1 further comprises a porthole 13. For positioning the plastic part 1 it is opened. In FIG. 1 the porthole 13 is illustrated in the open position. The first chamber 1 moreover comprises a first circulating device 14. In FIG. 1 it is illustrated as a stirrer. The first circulating device is provided for continuously circulating and thus mixing the solvent vapour which can be introduced into the first chamber 1 so as to ensure a homogeneous distribution of the solvent in the solvent vapour. Externally of the first chamber a suction device 15 is mounted. It is connected with the interior of the first chamber 1 by means of a closable connection 16. The closable connection 16 may, for instance, be opened and/or closed by a porthole or a valve. The suction device 15 is preferably used to suck off solvent vapour generated during the drying of the plastic part in the first chamber 1 before the plastic part is removed from the first chamber 1. This prevents a user from getting into contact with the solvent vapour.

The first chamber 1 moreover comprises first heating means (not illustrated). The first heating means serves to temperature-control the first chamber 1 to a first temperature. Preferably, the first heating means is integrated in one or a plurality of walls of the first chamber. If temperature-controlling of the first chamber 1 takes place by the heating of a plurality of, in a particularly preferred manner all, walls of the first chamber 1, this has the advantage that the condensation of solvent vapour on the walls of the first chamber 1 does not take place more intensely than on the plastic part to be smoothed. It can thus be avoided that the concentration of the solvent in the solvent vapour decreases too much due to condensation on the walls of the first chamber 1.

Finally, the bottom surface 17 of the first chamber 1 is inclined. This favours the returning of the solvent vapour and/or possibly of condensed solvent from the first chamber 1 into the second chamber 2.

The second chamber 2 serves to receive solvent vapour. The second chamber 2 illustrated in FIG. 1 comprises a second circulating device 21. In FIG. 1 it is illustrated as a stirrer. The second circulating device is provided for continuously circulating and thus mixing the solvent vapour with which the second chamber 2 can be filled, so as to ensure a homogeneous distribution of the solvent in the solvent vapour. Moreover, the second chamber 2 comprises an outlet 22. This outlet 22 serves to empty the second chamber 2. Preferably, solvent vapour is discharged through the outlet 22 after the smoothing of one or a plurality of plastic parts has been concluded. The outlet 22 may, however, also serve simultaneously as an inlet for previously prepared solvent vapour with which the second chamber 2 is filled.

The second chamber 2 moreover comprises second heating means (not illustrated). The second heating means serves to temperature-control the second chamber 2 to a second temperature. Preferably, the second heating means is integrated in one or a plurality of walls of the second chamber. Preferably, the second chamber 2 comprises second heating means integrated in the bottom surface 23. It may expediently be used to first of all evaporate liquid solvent introduced into the second chamber 2 in that the second heating means heats the bottom surface 23 to the boiling temperature/evaporation temperature of the solvent. In this case the second chamber 2 is filled with solvent vapour by liquid solvent being evaporated in the second chamber 2. If solvent vapour with a particular concentration of solvent has been generated, preferably by all of the solvent having evaporated, it is expedient to control the second heating means such that the temperature of the solvent vapour in the second chamber 2 comprises a predetermined second temperature. It is, however, also possible to introduce solvent vapour through the outlet 22 into the second chamber 2. The second heating means then temperature-controls the solvent vapour to a particular second temperature.

The first chamber 1 is connected with the second chamber 2 by a closable connection 5. If it is open it serves to enable solvent vapour to be introduced from the second chamber 2 into the first chamber 1, or to enable solvent vapour to be returned from the first chamber 1 into the second chamber 2. The closable connection 5 may, for instance, be implemented by a porthole or a valve.

The third chamber 3 serves to receive the gas or gas mixture present in the chamber 1. For this purpose a second closable connection 6 is provided between the first chamber 1 and the third chamber 3. The second closable connection 6 may, for instance, be implemented by a porthole or a valve. The third chamber 3 preferably comprises third heating means (not illustrated). It is expediently integrated in one or in a plurality of walls of the third chamber 3. FIG. 1 further illustrates an outlet 31. It may be implemented by a porthole or a closable cock. The gas or gas mixture, or else solvent vapour, which are present in the chamber 3 may be sucked off via the outlet 31.

The first chamber 1, the second chamber 2, and the third chamber 3 can preferably be insulated thermally. It is particularly preferred that these chambers 1, 2, 3 can be insulated thermally both from the environment and/or from each other. Thermal insulation exists if all connections 5, 6, 16 as well as apertures and/or portholes 13, 22, 31 are closed.

The apparatus 100 further comprises a drive element 4. The drive element 4 is adapted such that on activation or actuation thereof solvent vapour is transferred from the second chamber 2 into the first chamber if the closable connection 5 is open. In FIG. 1 the drive element 4 comprises a die 42. This die 42 separates the second chamber 2 from the third chamber. In order to ensure a thermal insulation of the second chamber 2 and the third chamber 3 it is of advantage that the drive element 4 is thermally insulated or is manufactured of and/or comprises a thermally insulated material. The drive element 4 may be transferred from an initial position to an end position. In the illustration the drive element 4 is in the initial position. In order to ensure that the second chamber 2 and the third chamber 3 remain thermally insulated from each other during the transferring of the drive element 4, the drive element 4 expediently comprises an elastic insulating element 41. In FIG. 1 this element is illustrated in the form of bellows 41. The bellows 41 are, on the one hand, fastened to the walls of the second chamber 2 and, on the other hand, to the die 42 of the drive element 4. The bellows 41 consist expediently of a thermally insulating material. The second chamber 2 and the third chamber 3 are thus thermally insulated, both in the initial position and in the end position as well as during the transferring of the drive element 4.

For transferring the drive element 4 from the initial position to the end position preferably a hydraulic element, in a particularly preferred manner a hydraulic cylinder (not illustrated) is used. Moreover, elastic elements, such as e.g. coil springs, may be used. In a particularly preferred manner they are integrated in the elastic insulating element 41.

The volume of the second chamber 2, provided that the drive element 4 is in the initial position, is expediently between 10% and 100% larger than the volume of the first chamber 1. The larger volume of the second chamber 2 ensures that sufficient solvent vapour is available to displace the major portion of the gas or gas mixture from the first chamber 1.

In FIGS. 2*a*-2*k* a process in accordance with the invention for chemical smoothing of a plastic part 10 produced by selective layerwise consolidation of a construction material using the apparatus 100 in accordance with the first embodiment is described. FIG. 2*a* shows the first step of the process. A plastic part 10 to be smoothed is positioned in the first chamber 1 of the apparatus 100. It is illustrated that the plastic part 10 is suspended on the hook 12 of the positioning means 11. The porthole 13 of the first chamber 1 is closed. Moreover, the closable connection 5 between the first chamber 1 and the second chamber 2 as well as the second closable connection 6 between the first chamber 1 and the third chamber 3 are closed. The first chamber 1 is filled with a gas or gas mixture 7. In a particularly preferred manner the first chamber 1 is filled with air 7 at the beginning of the smoothing process in accordance with the invention. The second chamber 2 and the third chamber 3 are then also filled with air. The first chamber 1 is temperature-controlled to a first temperature. By temperature-controlling of the first chamber 1 especially also the plastic part 10 assumes at least approximately the first temperature. Thus, it is possible to adjust the temperature of the plastic part 10, especially the temperature on the surface of the plastic part 10, to a predetermined value. The temperature-controlling of the plastic part 10 to the particular first temperature enables to control and/or regulate the precipitation of solvent on the plastic part 10 which takes place in the course of the process in accordance with the invention.

Figure 2B:
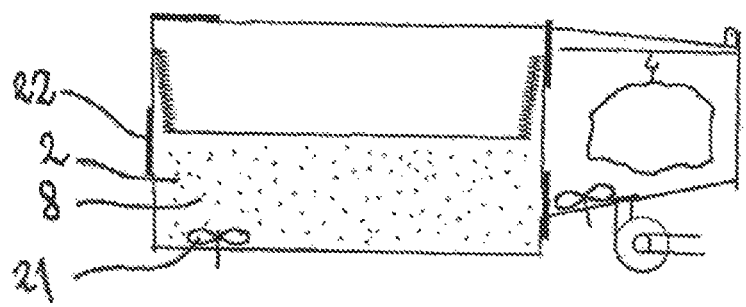

In FIG. 2b solvent vapour 8 is present in the second chamber 2. It is possible that the previously prepared solvent vapour 8 is filled into the second chamber 2 through the outlet 22. In accordance with the invention it is, however, also possible that the second chamber 2 is filled with solvent vapour 8 in that liquid solvent is introduced into the second chamber 2 and is then evaporated there. The second chamber 2 is temperature-controlled to a second temperature. The solvent vapour 8 is thus at least approximately temperature-controlled to the second temperature. In a particularly preferred manner the solvent vapour 8 is saturated with solvent. It is advantageous to choose the second temperature such that it corresponds approximately to the boiling temperature/evaporation temperature of the solvent in the second chamber 2. Thus, almost the largest-possible concentration of solvent in the solvent vapour can be achieved. In other words, the partial pressure of the solvent in the solvent vapour is approximately 100%. In accordance with the invention it is, however, also possible to temperature-control the second chamber 2 to a lower temperature than the temperature mentioned. In this case the solvent vapour is saturated with solvent already at a lower concentration (or equivalent: at a lower partial pressure of the solvent in the solvent vapour). Finally, it is also possible in accordance with the invention that the solvent vapour is not saturated completely with solvent.

By choosing a particular second temperature it is thus possible to control and/or adjust the concentration of the solvent in the solvent vapour 8.

If the solvent vapour 8 is saturated, it is sufficient in accordance with the invention that the first temperature is lower than the second temperature. If the solvent vapour 8 is not saturated, the first temperature has to be chosen lower than the dew point temperature of the solvent with the given concentration of the solvent in the solvent vapour 8. For the case that the second temperature corresponds approximately to the boiling temperature of the solvent in the second chamber 2 it is expedient to adjust the first temperature in the first chamber to 80% to 90% of said boiling temperature.

By circulating the solvent vapour with the aid of the second circulating device 21 a homogeneous distribution of the solvent in the solvent vapour 8 is ensured.

Figure 2C:
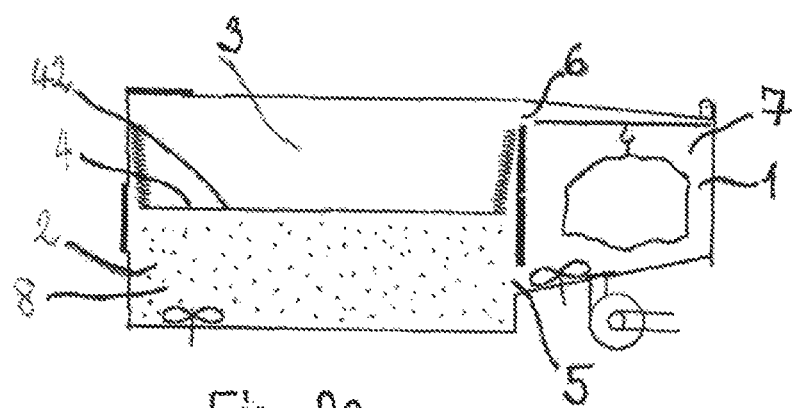
Figure 2D:
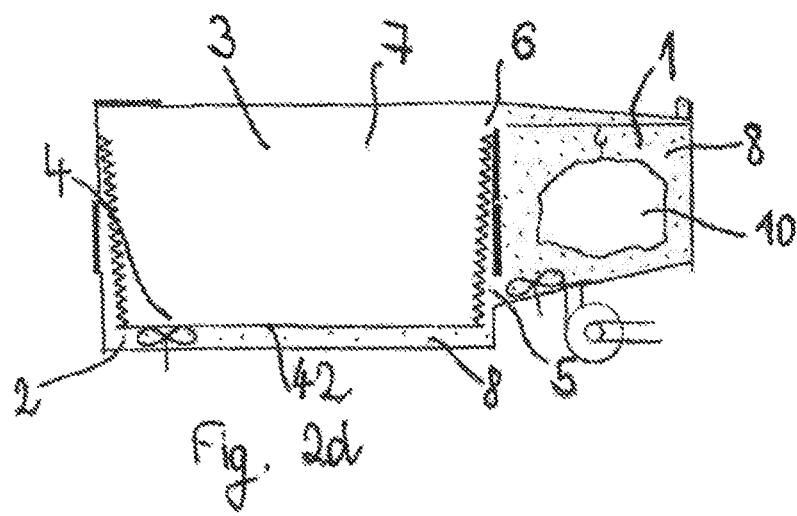

In FIGS. 2c and 2d the introducing of the solvent vapour 8 from the second chamber 2 into the first chamber 1 is illustrated. First of all both the closable connection 5 between the first chamber 1 and the second chamber 2 and the second closable connection 6 between the first chamber 1 and the third chamber 3 are opened. In FIG. 2c the drive element 4 is in the initial position. For introducing the solvent vapour 8 from the second chamber 2 into the first chamber 1 the drive element 4 is transferred to the end position; the end position is illustrated in FIG. 2d. The transferring of the drive element 4 causes the volume of the second chamber 2 to be reduced. At the same time the volume of the third chamber 3 is increased. The die 42 of the drive element 4 drives the solvent vapour 8 from the second chamber 2 into the first chamber 1. Due to the volume reduction of the second chamber 2 the pressure is increased there. The pressure gradient between the second chamber 2 and the first chamber 1 acts additionally as a driving force for the introduction of the solvent vapour 8 into the first chamber 1. The solvent vapour 8 flowing in displaces the gas or gas mixture 7 from the first chamber 1. Gas or gas mixture 7 is driven from the first chamber 1 into the third chamber 3. The latter-mentioned process is accelerated by the fact that the volume of the third chamber 3 is enlarged and thus a negative pressure prevails in the third chamber 3. It is particularly advantageous if the density of the solvent vapour 8 is larger than the density of the gas or gas mixture 7 in the first chamber 1. This is because then the gas or gas mixture 7 experiences a buoyancy force which favours the displacement of the gas or gas mixture 7 from the first chamber 1 into the third chamber 3.

In FIG. 2d the chamber 1 is filled and/or flooded almost completely with solvent vapour 8. The plastic part 10 is now completely surrounded by solvent vapour 8.

Figure 2E:
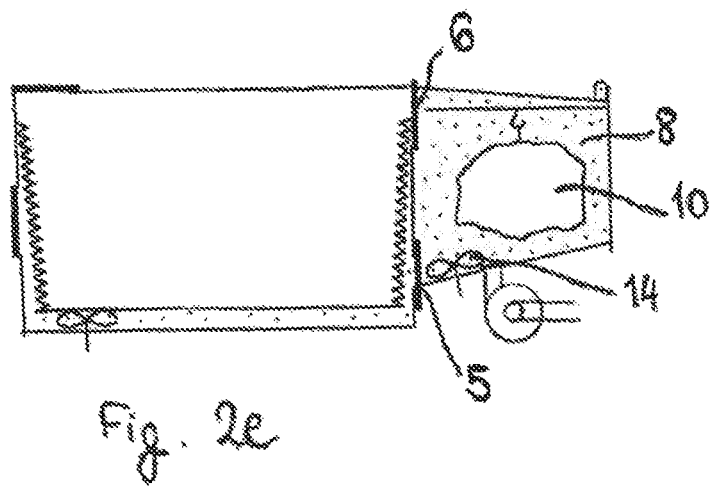

FIG. 2e shows that the closable connection 5 between the first chamber 1 and the second chamber 2 as well as the second closable connection 6 between the first chamber 1 and the third chamber 3 are closed. The plastic part 10 is surrounded almost completely by solvent vapour 8. It is expedient to circulate the solvent vapour 8 in the first chamber 1 so as to achieve a homogeneous distribution of the solvent. For this purpose a first circulating device 14 is provided. The plastic part is subjected to the solvent vapour 8 for a particular duration. Due to the fact that the temperature of the plastic part 10 and/or its surface corresponds approximately to the first temperature, the solvent in the solvent vapour 8 condenses on the surface of the plastic part 10. The solvent has been chosen such that it reacts with the material of the plastic part 10. This reaction has the result that an outer layer of the plastic part 10 is liquefied. Due to this liquefaction steps, edges, notches etc. on the surface of the plastic part 10 are smoothed. The amount of solvent precipitation on the surface of the plastic part 10 is influenced by the temperature difference between the first temperature and the second temperature. Likewise, the concentration of solvent in the solvent vapour 8 has an influence on said solvent precipitation. The following parameters determine the chemical smoothing of the surface of the plastic part 10: the temperature difference between the first chamber 1 and the second chamber 2, the concentration of the solvent in the solvent vapour 8, and the particular duration for which the plastic part 10 is subjected to the solvent vapour 8.

Figure 2F:
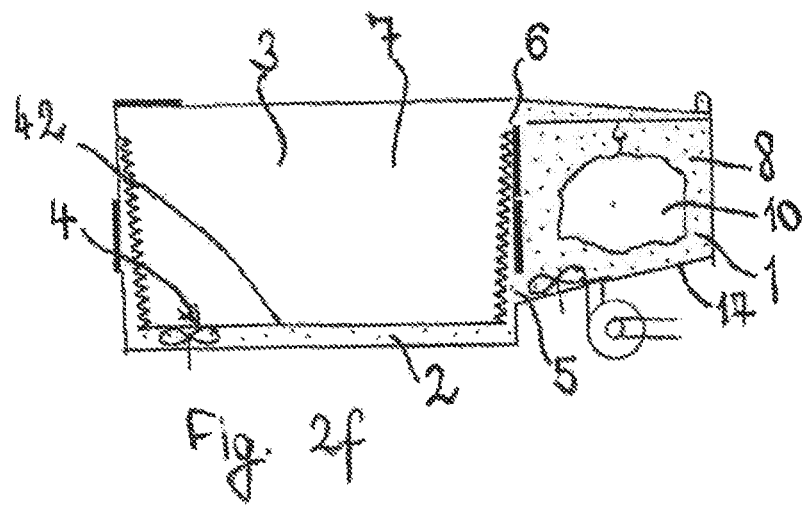
Figure 2G:
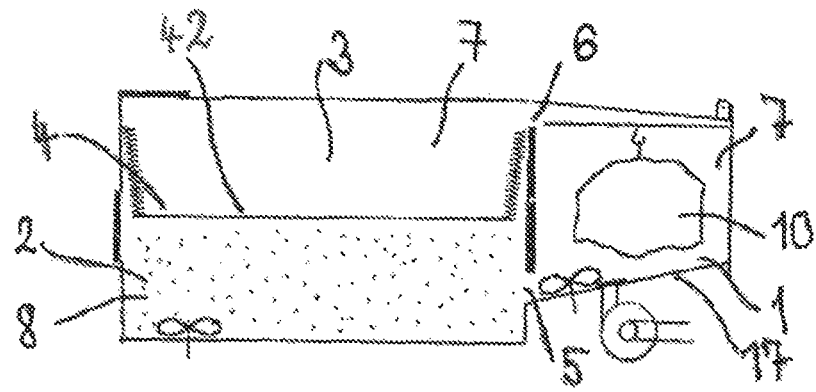

FIGS. 2f and 2g show the discharging and/or returning of the solvent vapour 8 from the first chamber 1 into the second chamber 2. After the plastic part having been subjected to the solvent vapour 8 for the particular duration, the closable connection 5 between the first chamber 1 and the second chamber 2 as well as the second closable connection 6 between the first chamber 1 and the third chamber 3 are opened. The drive element 4 is transferred from the end position, as illustrated in FIG. 2f, to the initial position, as illustrated in FIG. 2g. This increases the volume of the second chamber 2 again. This involves a reduction of the pressure in the second chamber 2, which causes a suction effect. The result is that a large portion of the solvent vapour 8 is returned to the second chamber 2. Moreover, during the transferring of the drive element 4 to the initial position the volume of the third chamber 3 is reduced simultaneously. The die 42 of the drive element 4 drives the gas or gas mixture 7 from the third chamber back into the first chamber 1. This process is favoured by the fact that a negative pressure is generated in the third chamber 3 due to the volume reduction. The lower density of the gas or gas mixture 7 relative to the solvent vapour 8 also contributes to urging the solvent vapour 8 back into the second chamber. Finally, the inclined inner wall/bottom surface 17 of the first chamber 1 favours the discharging of the solvent vapour 7. Due to the inclined inner wall/bottom surface 17 it is also possible to return solvent condensed in the first chamber 1 and trickled on the bottom surface 17 to the second chamber 2. There, it may be evaporated again.

Figure 2H:
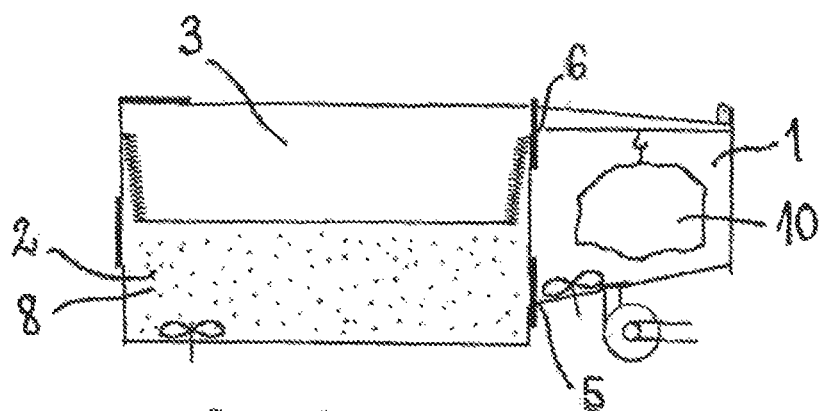

In FIG. 2h the drying process is shown. The closable connection 5 between the first chamber 1 and the second chamber 2 is closed again so as to prevent solvent vapour 8 from penetrating from the second chamber 2 into the first chamber 1. The second closable connection 6 between the first chamber 1 and the third chamber 3 is also closed so as to prevent solvent vapour generated during the drying process from penetrating into the third chamber 3. For drying the smoothed plastic part remains in the first chamber 1. It is advantageous to temperature-control the first chamber 1 to a temperature, preferably with the aid of the first heating means, which differs from the first temperature. Thus, the drying process can be regulated in a controlled manner.

Figure 2I:
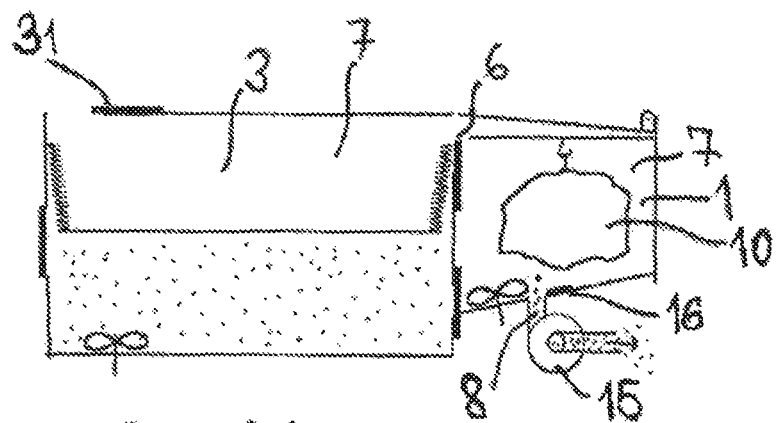

In FIG. 2i the end of the drying process is illustrated, namely before the smoothed plastic part 10 is removed from the first chamber 1. In order to remove the solvent vapour 8 generated during the drying process from the first chamber 1, it is sucked off. For this purpose a suction device 15 is used. It is positioned externally of the first chamber 1. The suction device 15 is connected with the interior of the first chamber 1 via a closable connection 16. For sucking, the closable connection 16 is opened. Moreover, the second closable connection 6 between the first chamber 1 and the third chamber 3 as well as the outlet 31 of the third chamber 3 is opened. This ensures that, during the sucking process, gas or gas mixture 7 can be supplied from the outside, preferably air 7 from the environment, and can penetrate into the first chamber 1 via the third chamber 3.

Figure 2J:
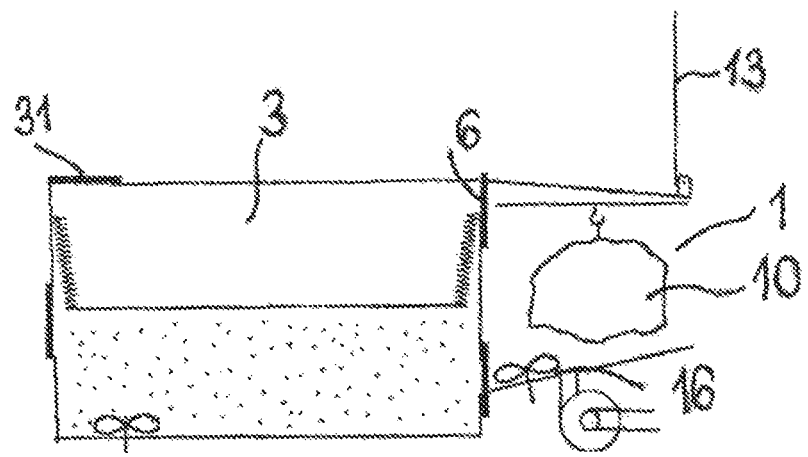
Figure 2H:
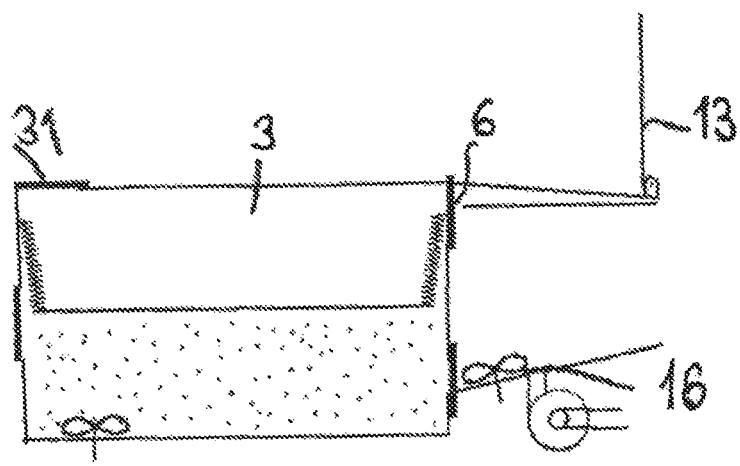

FIGS. 2j and 2k show the completion of the process in accordance with the invention. After the sucking almost exclusively gas or gas mixture 7, preferably air 7, is present in the first chamber 1. The outlet 31, the second closable connection 6 between the first chamber 1 and the third chamber 3, as well as the closable connection 16 are closed. The porthole 13 of the first chamber 1 may now be opened and the smoothed plastic part 10 may be removed from the first chamber 1.

For the user there is no danger of getting into contact with the solvent or solvent vapour throughout the entire smoothing process. Moreover, due to the returning from the first chamber into the second chamber the solvent vapour may be re-used for further process iterations.

If a plastic part to be smoothed is smoothed in a plurality of iterations, the first and/or second temperatures and/or the particular duration for subjecting the plastic part to the solvent vapour may be chosen for each iteration differently as compared to the previous iteration or to previous iterations. By the repeated iteration of the process steps mentioned it may be prevented in a controlled manner that an oversaturation of the surface of the plastic part with solvent condensate occurs, which would result in the formation of tears and drops. Due to the drying of the plastic part between two iterations it is possible to achieve an optimal drying of the surface. This contributes to the fact that no stains are produced on the surface of the plastic part.

FIG. 3a illustrates an apparatus 200 for chemical smoothing of a plastic part produced by selective layerwise consolidation of a construction material in accordance with a second embodiment of the invention. The illustrated plastic part 10 is not part of the apparatus 200 in accordance of the invention, but merely serves easier understanding. The apparatus 200 differs from the apparatus in accordance with the first embodiment only in that additionally an introduction device 19 is used in the chamber 1 which enables the smoothing of inner surfaces 18 of the plastic part 10. To the extent that the apparatus 200 does not differ from the apparatus of the first embodiment, the description of the first embodiment is referred to, which is not repeated in this place. Equal reference numbers indicate corresponding elements. An explicit description of these equal elements is abstained from, and reference is made to the description of FIG. 1.

The introduction device 19 illustrated in FIG. 3a is provided for specifically directing and/or concentrating the solvent vapour introduced from the second chamber 2 into the first chamber 1 on a particular place of the plastic part 10. The illustrated introduction device 19 is designed such that it divides the first chamber 1 in two areas 101, 102. The solvent vapour may first of all get into the area 102 and may then penetrate, via an aperture and/or a connection element 191 of the introduction device 19, into the area 101. The aperture and/or the connection element 191 is expediently designed such that it is tightly connected with the plastic part 10. The connection with the plastic part 10 is preferably performed such that the solvent vapour is forced to flow through the interior 18 of the plastic part 10. Thus, the inner surfaces 18 of the plastic part 10 are smoothed. In FIG. 3a the introduction device 19 is designed as a plate which is sealed all around at the side walls of the first chamber 1. As an aperture the plate comprises a flange in the middle. Expediently, a tube may be flanged for this purpose. The tube may then be connected tightly with the plastic part 10.

The steps of the process in accordance with the invention for chemical smoothing of inner surfaces of a plastic part 10 as illustrated in FIGS. 3a-3h correspond substantially to the steps illustrated in FIGS. 2a-2k. In the following, therefore, only the particularities of the process for smoothing the inner surfaces of the plastic part will be dealt with (which are specifically illustrated in FIG. 3d). As for the rest, reference is made to the corresponding description of the process illustrated in FIGS. 2a-2k.

FIG. 3a also illustrates a step of the process in accordance with the invention for smoothing of inner surfaces 18 of a plastic part 10. In FIG. 3a the plastic part 10 with inner surfaces 18 is positioned in the first chamber 1. The plastic part 10 is connected with the introduction device 19. The first chamber 1 and hence the plastic part 10 is temperature-controlled to a first temperature. The explanations with respect to FIG. 2a apply correspondingly here.

Figure 3B:
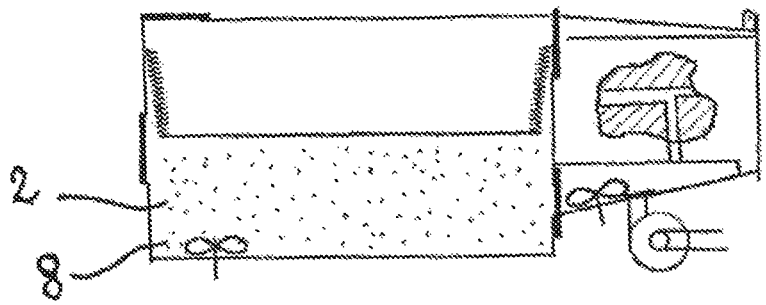
Figure 3C:
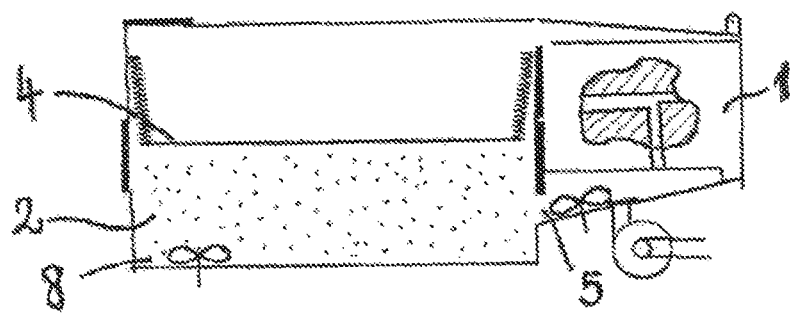

For the filling of the second chamber 2 with solvent vapour 8 as illustrated in FIG. 3b, the explanations in connection with FIG. 2 apply. For the beginning of the introduction of the solvent vapour 8 from the second chamber 2 into the first chamber 1 by transferring the drive element 4 from the initial position to the end position with an open closable connection 5 between the first chamber 1 and the second chamber 2, as illustrated in FIG. 3b, the statements with respect to FIG. 2c apply correspondingly.

Figure 3D:
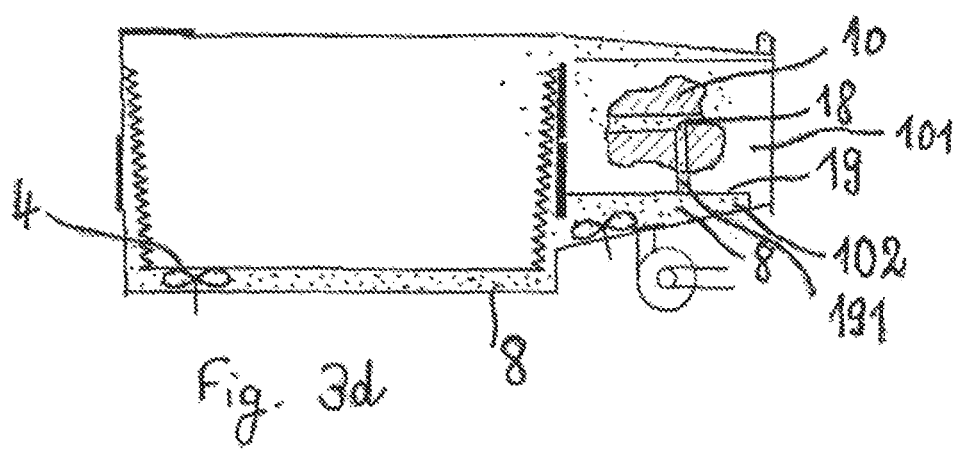

In FIG. 3d the drive element 4 is illustrated in the end position. The major portion of the solvent vapour 8 was driven from the second chamber 2 into the first chamber 1. The introduction device 19 positioned in the first chamber 1 divides the first chamber 1 into a first area 101 and a second area 102. In the first area 101 the plastic part 10 to be smoothed is positioned. In the second area 102 the solvent vapour 8 from the second chamber 2 is introduced. Due to the specific design of the introduction device 19 the solvent vapour 8 is guided through the connection element 191 which is tightly connected with the plastic part 10, expediently with the interior 18 thereof. As a result, the solvent vapour 8 flows through the interior 18 of the plastic part 10. Thus, the smoothing of the inner surfaces 18 of the plastic part 10 is enabled. The plastic part 10 and/or its interior 18 is subjected to the solvent vapour 18 for a particular duration.

As described in the case of the first embodiment, the temperature difference between the first chamber 1 and the second chamber 2, the concentration of the solvent in the solvent vapour 8, and the particular duration for which the plastic part 10 is subjected to the solvent vapour 8 determine the chemical smoothing of the inner surfaces 18 of the plastic part 10. The choice of said parameters enables a controlled chemical smoothing of the inner surfaces 18.

Figure 3E:
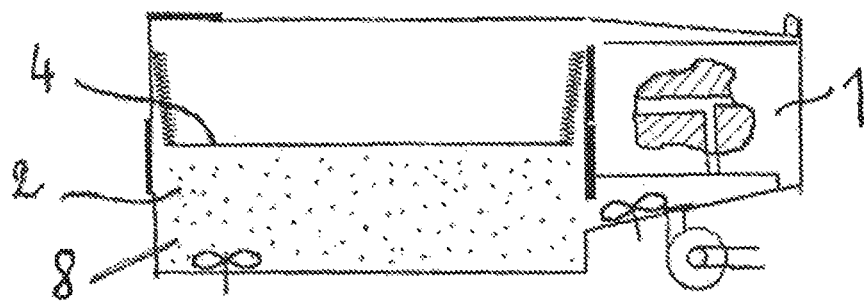

After subjecting the inner surfaces of the plastic part 10 to the solvent vapour 8 the solvent vapour 8 is again discharged from the first chamber 1 into the second chamber 2, as illustrated in FIG. 3e. For this purpose the drive element 4 is again transferred from the end position to the initial position. This is done as described in connection with FIGS. 2f and 2g.

Figure 3F:
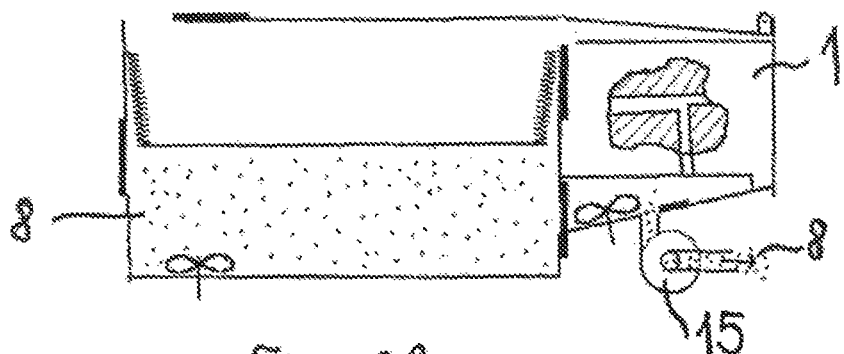
Figure 3G:
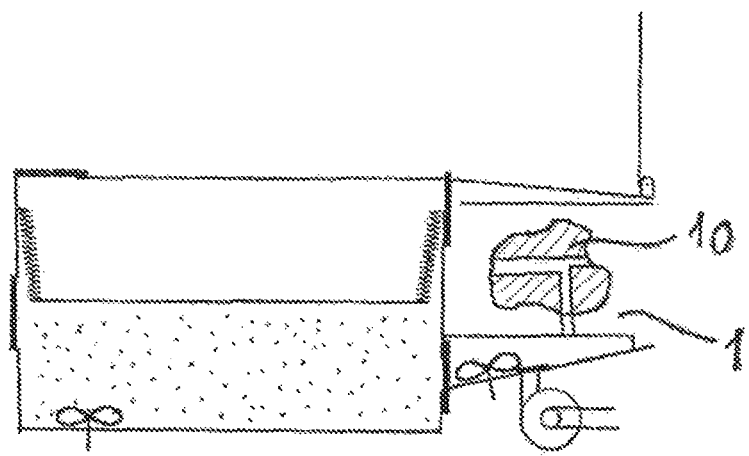
Figure 3H:
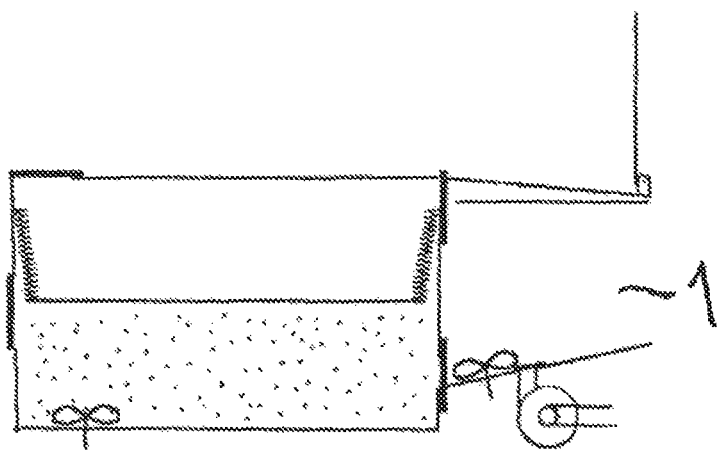

Drying and sucking 15 of the solvent vapour 8 from the first chamber 1, as illustrated in FIG. 3f, takes place as described in connection with FIGS. 2h and 2i. The removing of the smoothed plastic part 10 from the apparatus, as illustrated in FIGS. 3g and 3h, takes place as described in connection with FIGS. 2j and 2k.

FIG. 4a illustrates a third embodiment in accordance with the invention of an apparatus 300 for chemical smoothing of a plastic part 10 produced by selective layerwise consolidation of a construction material. The illustrated plastic part 10 is not part of the apparatus 300 in accordance with the invention, but merely serves easier understanding. The apparatus 300 differs from the apparatus in accordance with the first embodiment substantially by the different arrangement of the first chamber 301, the second chamber 302, and the third chamber 303. In the apparatus illustrated in FIG. 4a the first chamber 301 is arranged between the second chamber 302 and the third chamber 303. The three chambers 301, 302, and 303 are stacked on top of each other.

The drive element 304 is positioned in the second chamber 302. The design and the functionality of the drive element 304 correspond to that of the drive element of the first embodiment (designated with reference number 4 there), as will be described further below.

The first chamber 301 serves to receive the plastic part 10 to be smoothed. For this purpose, like in the case of the first embodiment, positioning means 311 which may, for instance, be designed as a crane with a hook 312, is arranged in the first chamber 301. The first chamber 301 further comprises a porthole 313 which may be opened for positioning and removing the plastic part 10. Like in the first embodiment the first chamber 301 comprises first heating means (not illustrated) for temperature-controlling the first chamber 301 to a first temperature. With respect to preferred configurations of the first chamber 301, especially the first heating means, reference is made to the first embodiment. The first chamber 301 is adapted to be filled with a gas or gas mixture 7, preferably air 7 is present in the first chamber 301.

The second chamber 302 serves to receive solvent vapour. The second chamber 302 comprises second heating means (not illustrated) for temperature-controlling the second chamber 302 to a second temperature. The second chamber 302 further comprise a drive element 304 which—as in the case of the first embodiment—is adapted such that on activation or actuation thereof solvent vapour is transferred from the second chamber 302 into the first chamber 301. The illustrated drive element 304 comprises a die 342 and an elastic insulating element 341, wherein the latter is, for instance, designed in the form of bellows. The drive element 304 may be transferred from an initial position to an end position. With respect to the further configuration of the drive element 304, reference is made to the description of the first embodiment.

The first chamber 301 is connected with the second chamber 302 by a closable connection 305. If it is open, it serves to provide that solvent vapour can be introduced from the second chamber 302 into the first chamber 301, or that solvent vapour can be returned from the first chamber 301 into the second chamber 302. In FIG. 4a the closable connection 305 is closed. As may be seen later in FIGS. 4c, 4d, and 4f, the closable connection 305 may, for instance, be implemented by means of folding portholes.

The third chamber 303 serves to receive the gas or gas mixture 7 present in the first chamber 301. For this purpose a second closable connection 306 is provided between the first chamber 301 and the third chamber 303. In FIG. 4a the second closable connection 306 is closed. As may be seen later in FIGS. 4c, 4d, and 4f, the second closable connection 306 may, for instance, be implemented by foldable portholes. As in the case of the first embodiment, the third chamber 303 preferably comprises third heating means (not illustrated). FIG. 4a further illustrates an outlet 331 via which the gas or gas mixture 7, or else solvent vapour, which are present in the third chamber 303 may be sucked off. The outlet 331 expediently also serves to provide that gas or gas mixture 7 can be displaced from the third chamber 303. The outlet 331 may, for instance, be implemented by an overflow valve.

In FIGS. 4a-4g a process in accordance with the invention for chemical smoothing of a plastic part 10 produced by selective layerwise consolidation of a construction material using the apparatus 300 in accordance with the third embodiment is described.

FIG. 4a also illustrates a step of the process for the chemical smoothing of the plastic part 10 by means of the apparatus 300. In FIG. 4a the plastic part 10 to be smoothed was positioned in the first chamber 301. The first chamber 301 is filled with a gas or gas mixture 7. The first chamber 301, and hence the plastic part 10, is temperature-controlled to a first temperature. This step corresponds to the step illustrated in FIG. 2a, whose description applies correspondingly also with respect to FIG. 4a, and which is referred to.

Figure 4B:
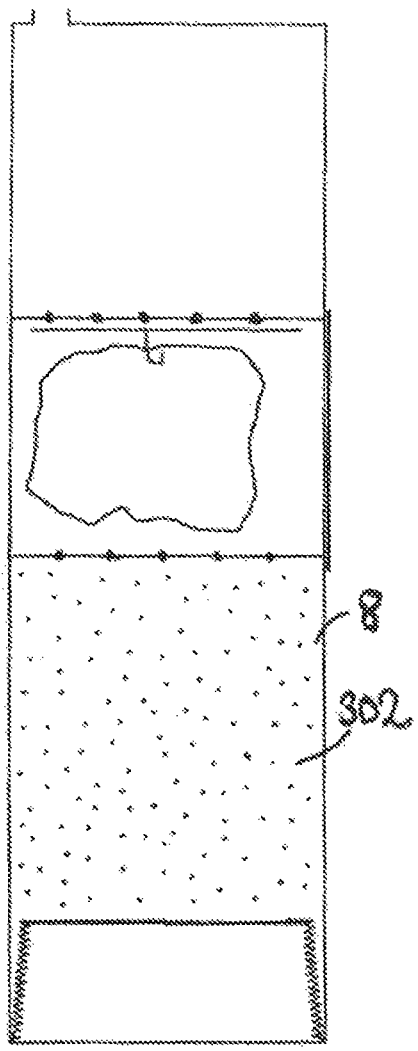

In FIG. 4b solvent vapour 8 was filled into the second chamber 302. The second chamber 302 is temperature-controlled to a second temperature. The solvent vapour 8 is thus temperature-controlled at least approximately to the second temperature. The step of filling of the second chamber 302 with solvent vapour may take place in correspondence with the step illustrated in FIG. 2b in connection with the first embodiment, which is referred to.

Figure 4C:
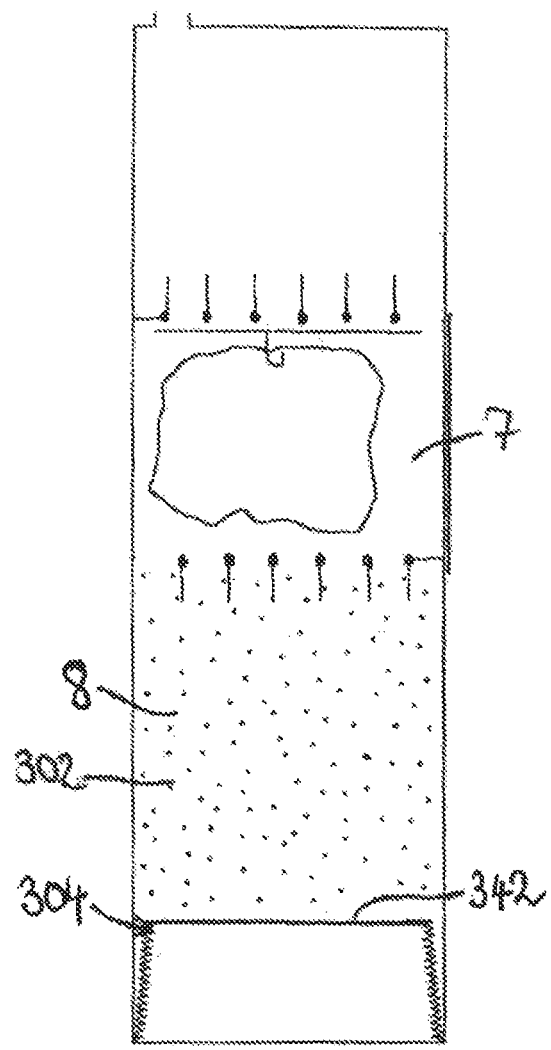
Figure 4D:
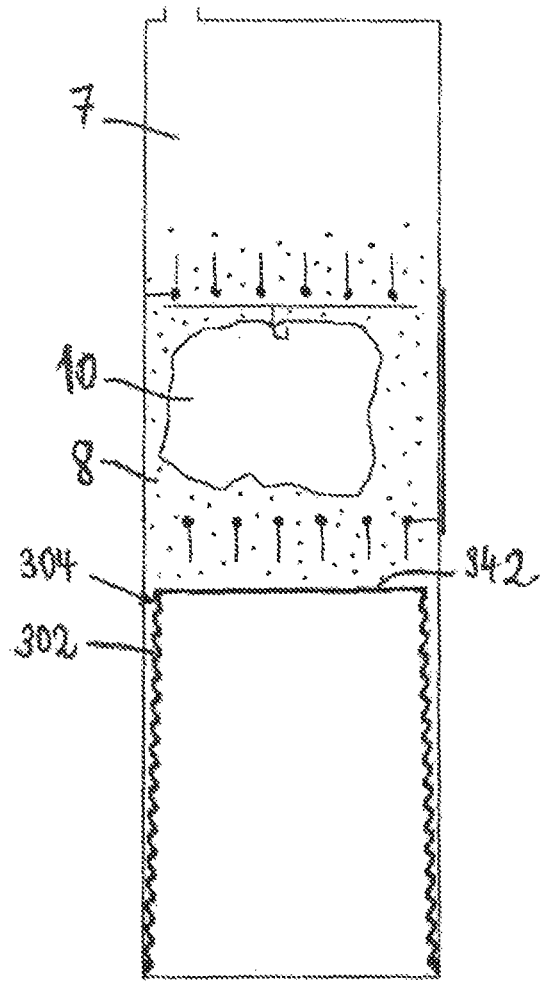

In FIGS. 4c and 4d the introduction of the solvent vapour 8 from the second chamber 302 into the first chamber 301 is shown. First, both the closable connection 305 between the first chamber 301 and the second chamber 302 as well as the second closable connection 306 between the first chamber 301 and the third chamber 303 are opened. In FIG. 4c the drive element 304 is in the initial position. For introducing the solvent vapour 8 from the second chamber 302 into the first chamber 301 the drive element 304 is transferred to the end position; the end position is illustrated in FIG. 4d. The result of the transferring of the drive element 304 is that the volume available for the solvent vapour 8 in the second chamber 302 is reduced. The die 342 of the drive element 304 drives and/or transports and/or urges the solvent vapour 8 from the second chamber 302 into the first chamber 301. The solvent vapour 8 flowing into the first chamber 301 displaces the gas or gas mixture 7 from the first chamber 301. Gas or gas mixture 7 is driven from the first chamber 301 into the third chamber 303. This latter-mentioned process is favoured if the density of the solvent vapour 8 is larger than the density of the gas or gas mixture 7 in the first chamber 301. This is because then the gas or gas mixture 7 experiences a buoyancy force favouring the displacement of the gas or gas mixture 7 from the first chamber 301 into the third chamber 303.

In FIG. 4d the first chamber 301 is filled and/or flooded almost completely with solvent vapour 8. The plastic part 10 is now surrounded completely by solvent vapour 8.

Figure 4E:
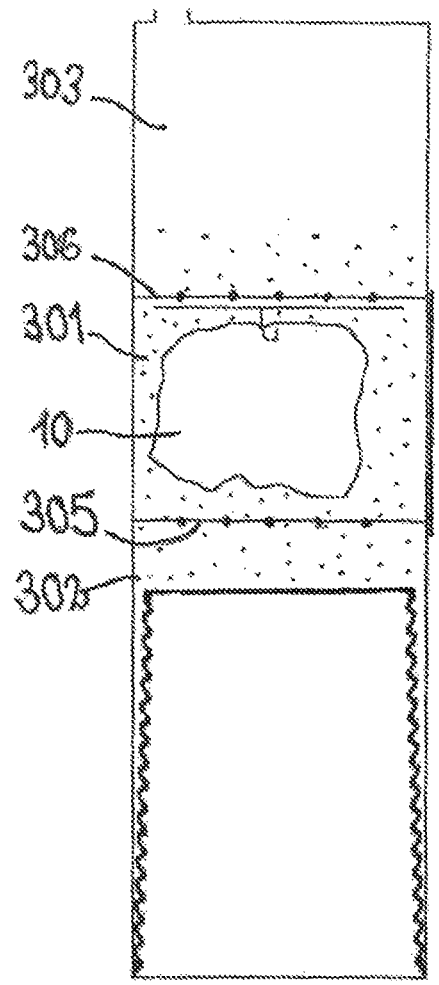

FIG. 4e illustrates that the closable connection 305 between the first chamber 301 and the second chamber 302 as well as the second closable connection 306 between the first chamber 301 and the third chamber 303 are closed. The plastic part 10 is surrounded almost completely by solvent vapour 8. In correspondence with the description of FIG. 2e in connection with the first embodiment the plastic part 10 is subjected to the solvent vapour 8 for a particular duration. Due to the fact that the temperature of the plastic part 10 and/or its surface corresponds approximately to the first temperature, the solvent in the solvent vapour 8 condenses on the surface of the plastic part 10. As described in connection with the first embodiment, the chemical smoothing of the plastic part 10 may be controlled by a particular specification of the temperature difference between the first chamber 301 and the second chamber 302, the concentration of the solvent in the solvent vapour 8, and the particular duration for which the plastic part 10 is subjected to the solvent vapour 8. For further details reference is made to the first embodiment.

Figure 4F:
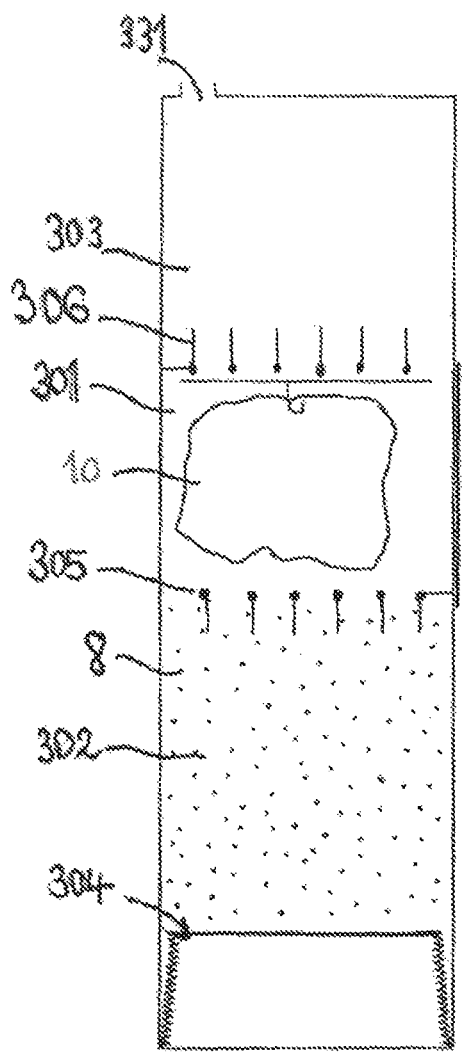

FIG. 4f shows the discharging and/or returning of the solvent vapour 8 from the first chamber 301 into the second chamber 302. After the plastic part 10 was subjected to the solvent vapour 8 for the particular duration, the closable connection 305 between the first chamber 301 and the second chamber 302 as well as the second closable connection 306 between the first chamber 301 and the third chamber 303 are opened. The drive element 304 was transferred from the end position to the initial position shown in FIG. 4f. This increases the volume of the second chamber 302 again. Thus, more volume is again available for the solvent vapour 8. Solvent vapour 8 having a larger density than air will sink back into the second chamber 302. Gas or gas mixture 7, preferably air 7, preferably having a lower density than that of the solvent vapour 8, may additionally be introduced and/or flow into the third chamber 303 through the outlet 331. The consequence of this is that the gas or gas mixture 7, preferably the lighter in-flowing air, with the second closable connection 306 open, urges the heavier solvent vapour 8 further back into the second chamber 302.

Figure 4G:
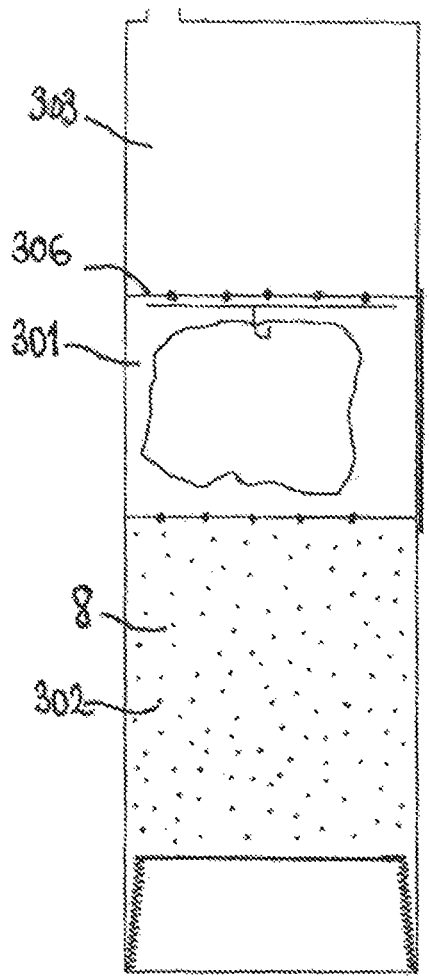

In FIG. 4g the drying process is shown. The closable connection 305 between the first chamber 301 and the second chamber 302 is closed again so as to prevent solvent vapour 8 from penetrating from the second chamber 302 into the first chamber 301. The second closable connection 306 between the first chamber 301 and the third chamber 303 is also closed so as to prevent solvent vapour 8 generated during the drying process from penetrating into the third chamber 303. For drying, the smoothed plastic part 10 remains in the first chamber 301. The statements rendered in connection with the drying process according to the first embodiment as illustrated in FIGS. 2h and 2i apply correspondingly for the drying process in accordance with the third embodiment.

The smoothing process may be performed in a plurality of iterations, in correspondence with the statements rendered with respect to the first embodiment.

The removing of the smoothed plastic object (not illustrated) from the apparatus of the third embodiment takes place in analogy to the description of FIGS. 2j and 2k and is therefore not repeated here anymore.

LIST OF REFERENCE NUMBERS

100 apparatus for chemical smoothing in accordance with the first embodiment
1 first chamber
2 second chamber
3 third chamber
4 drive element
5 closable connection between the first chamber 1 and the second chamber 2
6 second closable connection between the first chamber 1 and the third chamber 3
7 gas or gas mixture/air
8 solvent vapour
10 plastic part
11 positioning means
12 hook of the positioning means 11
13 porthole of the first chamber 1
14 first homogenisation device/first circulating device
15 suction device
16 closable connection to the suction device 15
17 inclined inner wall/bottom surface of the first chamber 1
18 inner surfaces/interior of the plastic part 10
19 introduction device for introducing the solvent vapour 8 into the interior of the plastic part 10
191 connection element of the introduction device 19
101 first area of the first chamber 1
102 second area of the first chamber 1
21 second homogenisation device/second circulating device
22 outlet of the second chamber 2
23 bottom surface of the second chamber 2
31 outlet of the third chamber 3
41 elastic insulating element/bellows of the drive element 4
42 die of the drive element 4
200 apparatus for chemical smoothing in accordance with the second embodiment
300 apparatus for chemical smoothing in accordance with the third embodiment
301 first chamber of the apparatus 300

302 second chamber of the apparatus 300
303 third chamber of the apparatus 300
304 drive element of the apparatus 300
305 closable connection between the first chamber 301 and the second chamber 302
306 second closable connection between the first chamber 301 and the third chamber 303
311 positioning means of the apparatus 300
312 hook of the positioning means 311
313 porthole of the first chamber 301
331 outlet of the third chamber 303
341 elastic insulating element/bellows of the drive element 304
342 die of the drive element 304

The invention claimed is:

1. A process for chemical smoothing of a plastic part (10), comprising the following steps:
    positioning the plastic part (10) in a first chamber (1, 301) filled with a gas or a gas mixture (7);
    filling a second chamber (2, 302) with a solvent vapour (8) comprising a solvent;
    temperature-controlling the first chamber (1, 301) to a first temperature by using a first heating means to thus temperature-control the plastic part (10) at least approximately to the first temperature;
    temperature-controlling the second chamber (2, 302) to the second temperature by using a second heating means to thus temperature-control the solvent vapour (8) at least approximately to the second temperature;
    introducing the solvent vapour (8) from the second chamber (2, 302) into the first chamber (1, 301);
    wherein the step of introducing the solvent vapour (8) from the second chamber (2, 302) into the first chamber (1, 301) comprises that the volume of the second chamber (2, 302) is reduced;
    subjecting the plastic part (10) to the solvent vapour (8) temperature-controlled to the second temperature for a particular duration,
        wherein the subjecting of the plastic part (10) to the solvent vapour (8) has the result that an outer layer of the plastic part (10) is liquefied; and
    discharging at least a portion of the solvent vapour (8) after the particular duration,
        wherein the plastic part (10) is stationary from commencement of the temperature-controlling of the plastic part until termination of the discharging of the solvent vapour (8).

2. The process according to claim 1, wherein the step of filling the second chamber (2, 302) comprises:
    introducing a particular amount of solvent into the second chamber (2, 302);
    evaporating the solvent in the second chamber (2, 302) to thus adjust an appropriate particular degree of saturation of the solvent vapour (8).

3. The process according to claim 1, wherein the step of discharging at least a portion of the solvent vapour (8) comprises:
    discharging at least a portion of the solvent vapour (8) from the first chamber (1, 301) into the second chamber (2, 302) after the particular duration.

4. The process according claim 1, further comprising the following step:
    drying the plastic part (10) after discharging the solvent vapour (8), wherein the plastic part (10) is still stationary during drying.

5. The process according to claim 1, wherein the filling of the second chamber (2, 302) with the solvent vapour (8) comprises that the solvent vapour (8) is homogenised in the second chamber (2, 302).

6. The process according to claim 1, wherein the step of discharging at least a portion of the solvent vapour (8) comprises: introducing gas or gas mixture (7) into the first chamber (1, 301).

7. The process for smoothing a plastic part (10),
    wherein the steps from temperature-controlling the plastic part (10) to discharging at least a portion of the solvent vapour (8) according to claim 1 are run through repeatedly, and
    wherein the plastic part (10) is stationary during the repeated running through of the steps.

8. The process according to claim 7, wherein, with each running through, the particular duration for which the plastic part (10) is subjected to the solvent vapour (8) is chosen differently.

9. The process according to claim 1, wherein the solvent vapour (8) is saturated with the solvent.

10. The process according to claim 1, wherein the first temperature is chosen such that the density of the gas or gas mixture (7) prior to the introduction of the solvent vapour (8) is lower than the density of the solvent vapour (8) in the second chamber (2, 302).

11. An apparatus (100, 200, 300) for chemical smoothing of a plastic part (10), comprising:
    a first chamber (1, 301) adapted to be filled with a gas or gas mixture (7),
        comprising positioning means (11) for receiving the plastic part (10) as well as first heating means for temperature-controlling the first chamber (1, 301) to a first temperature;
    a second chamber (2, 302) for receiving a solvent vapour (8) which, when acting on the plastic part (10), causes an outer layer of the plastic part (10) to be liquefied, comprising second heating means for temperature-controlling the second chamber (2, 302) to a second temperature; and
    a drive element (4, 304);
    wherein the first chamber (1, 301) is connected with the second chamber (2, 302) by a closable connection (5, 305),
    wherein the drive element (4, 304) is transferable from an initial position to an end position such that the transferring of the drive element (4, 304) from the initial position to the end position has the result that the solvent vapour (8) is introduced from the second chamber (2, 302) into the first chamber (1, 301) if solvent vapour (8) is present in the second chamber (2, 302) and the closable connection (5, 305) between the first chamber (1, 301) and the second chamber (2, 302) is open.

12. The apparatus (100, 200, 300) according to claim 11, further comprising a third chamber (3, 303) which is connected with the first chamber (1, 301) by a second closable connection (6, 306), wherein the third chamber (3, 303) is provided for receiving at least a portion of the gas or gas mixture (7) from the first chamber (1, 301) if the drive element (4, 304) is transferred from the initial position to the end position and if the first chamber (1, 301) is filled with gas or gas mixture (7).

13. The apparatus (100, 200, 300) according to claim 11, wherein the transferring of the drive element (4, 304) from the initial position to the end position has the result that the volume of the second chamber (2, 302) is reduced.

14. The apparatus (100, 200, 300) according to claim 11, wherein the first chamber (1) comprises an inclined inner wall (17) which is configured such that at least a portion of the solvent vapour (8) is discharged from the first chamber (1) into the second chamber (2) if solvent vapour (8) is present in the first chamber (1), the closable connection (5) between the first chamber (1) and the second chamber (2) is open, and the drive element (4) is transferred from the end position to the initial position.

15. The apparatus (100, 200, 300) according to claim 11, wherein the transferring of the drive element (4, 304) from the end position to the initial position has the result that at least a portion of the solvent vapour (8) is discharged from the first chamber (1, 301) into the second chamber (2, 302) if solvent vapour (8) is present in the first chamber (1, 301) and the closable connection (5, 305) between the first chamber (1, 301) and the second chamber (2, 302) is open.

16. The apparatus (100, 200, 300) according to claim 11, wherein the first chamber (1) comprises an introduction device (19) configured to be connected with the plastic part (10) and to introduce the solvent vapour (8) into the interior (18) of the plastic part (10).

17. The process according to claim 1, wherein the solvent is chosen from the group consisting of formic acid, acetone, and tetrahydrofuran, THF.

18. The apparatus (100, 200, 300) according to claim 11, wherein the solvent is chosen from the group consisting of formic acid, acetone, and tetrahydrofuran, THF.

* * * * *